United States Patent Office 3,357,968
Patented Dec. 12, 1967

3,357,968
FLUORO-SUBSTITUTED PHENYLAZO-
PYRIDINES
Godfrey Wilbert, Carmel, and Henry Wetstein, Monroe,
N.Y., assignors to Nepera Chemical Co., Inc.
No Drawing. Filed Aug. 10, 1964, Ser. No. 388,713
3 Claims. (Cl. 260—156)

ABSTRACT OF THE DISCLOSURE

A class of azo pyridines of the formula:

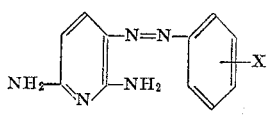

where X is fluorine or trifluoromethyl. These compounds are useful as dye stuff.

---

This invention relates to a composition of matter and relates more particularly to fluoro-substituted phenylazopyridines of the formula:

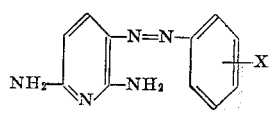

wherein X may be fluorine or fluoro-lower alkyl such as the trifluoromethyl group.

The compounds of this invention are useful as industrial dyestuffs.

According to the process of this invention, the above compounds are produced by diazotizing certain fluoroaniline or amino-benzotrifluorides of the formula:

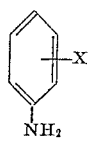

wherein X is as defined.

This diazotization reaction may be effected by reacting the selected starting compound with sodium nitrite in the presence of hydrochloric acid or nitrous acid at a temperature below 5° C. to form a diazonium salt of the formula:

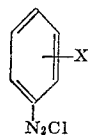

At the completion of this diazotization reaction the excess acid may be neutralized by the addition of an alkali such as sodium or potassium bicarbonate.

The diazonium salt formed is then coupled at 10° C. or lower with 2,6-diaminopyridine of the formula:

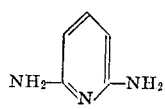

to form the novel diazo compounds of this invention. The diazo compound may be readily recovered from the reaction mixture as a precipitate.

The following examples are included in order further to illustrate the invention.

EXAMPLE 1

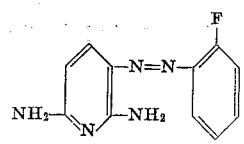

2,6-diamino-3-(o-fluorophenylazo)-pyridine

A diazonium solution is prepared by dissolving 6.9 g. sodium nitrite in 50 ml. of water and slowly adding it to 11.1 g. (0.1 mols) of o-fluoroaniline dissolved in 270 ml. of water containing 30 ml. of hydorchloric acid, while maintaining the temperature below 5° C. To 225 ml. of water containing 8.7 ml. of glacial acetic acid is added 10.9 g. (0.1 mols) of 2,6-diaminopyridine. Then 8.7 liters of ice are added and 109 g. of sodium bicarbonate. The diazonium solution is then added rapidly with vigorous agitation to the solution containing the 2,6-diaminopyridine. The product, 2,6-diamino-3-(o-fluorophenylazo)-pyridine is filtered, washed with cold water and dried. The orange solid obtained has a melting range of 132°–133° C.

EXAMPLE 2

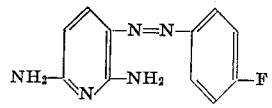

2,6-diamino-3-(p-fluorophenylazo)-pyridine

A solution of p-fluoroaniline is prepared, then diazotized as described in Example 1 and coupled with 2,6-diaminopyridine. The yellow dye is filtered from the reaction mixture, washed with cold water and dried. It has a melting range of 156°–158° C.

EXAMPLE 3

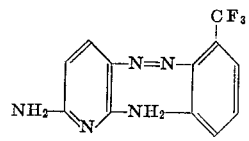

2,6-diamino-3-(o-trifluoromethylphenylazo)-pyridine

A solution of o-aminobenzotrifluoride is prepared as described in Example 1, and then diazotized and coupled with 2,6-diaminopyridine. The orange dye obtained is filtered off, washed with cold water and dried. It has a melting range of 148°–149° C.

EXAMPLE 4

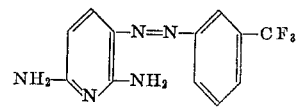

2,6-diamino-3-(m-trifluoromethylphenylazo)-pyridine

A solution of m-aminobenzotrifluoride is prepared as described in Example 1, diazotized and coupled with 2,6-diaminopyridine. The yellow dye obtained is filtered off, washed with cold water and dried. It has a melting range of 125°–127° C.

It is understood that the foregoing detailed description is given merely by way of illustration and that many variations may be made therein without departing from the spirit of our invention.

Having described our invention, what we desire to secure by Letters Patent is:

1. A compound of the formula:

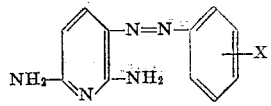

wherein X is fluorine attached in the para or ortho position.

2. 2,6-diamino-3-(o-fluorophenylazo)-pyridine.
3. 2,6-diamino-3-(p-fluorophenylazo)-pyridine.

References Cited

UNITED STATES PATENTS 1,680,109   8/1928   Ostromislensky _____ 260—156
2,029,315   2/1936   Engelmann _____ 260—156

CHARLES B. PARKER, Primary Examiner.
D. PAPUGA, Assistant Examiner.